United States Patent
Sloth

(10) Patent No.: US 9,004,246 B2
(45) Date of Patent: Apr. 14, 2015

(54) SYSTEM FOR DAMPING OSCILLATIONS IN A STRUCTURE

(75) Inventor: Erik Sloth, Ronde (DK)

(73) Assignee: Vestas Wind Systems A/S, Aarhus N. (DK)

(*) Notice: Subject to any disclaimer, the term of this patent is extended or adjusted under 35 U.S.C. 154(b) by 887 days.

(21) Appl. No.: 12/602,240

(22) PCT Filed: May 31, 2007

(86) PCT No.: PCT/DK2007/050064
§ 371 (c)(1),
(2), (4) Date: Jun. 9, 2010

(87) PCT Pub. No.: WO2008/145122
PCT Pub. Date: Dec. 4, 2008

(65) Prior Publication Data
US 2010/0243392 A1     Sep. 30, 2010

(51) Int. Cl.
| | |
|---|---|
| *F16F 15/02* | (2006.01) |
| *E04B 1/98* | (2006.01) |
| *F03D 11/00* | (2006.01) |
| *F03D 11/04* | (2006.01) |
| *F16F 7/10* | (2006.01) |

(52) U.S. Cl.
CPC ............... *E04B 1/985* (2013.01); *F03D 11/00* (2013.01); *F03D 11/04* (2013.01); *F05B 2260/96* (2013.01); *F05B 2260/962* (2013.01); *F16F 7/1005* (2013.01); *Y02B 10/30* (2013.01); *Y02E 10/725* (2013.01); *Y02E 10/728* (2013.01)

(58) Field of Classification Search
CPC ........ F16F 15/02; F16F 7/1011; F16F 7/1028
USPC ................ 188/378; 267/136, 140.14, 140.15; 310/81; 318/696
See application file for complete search history.

(56) References Cited

U.S. PATENT DOCUMENTS

| | | | | |
|---|---|---|---|---|
| 3,913,409 | A | * | 10/1975 | Opderbeck ....................... 74/61 |
| 4,241,615 | A | * | 12/1980 | Ryan ................................. 74/61 |
| 5,167,163 | A | * | 12/1992 | McMahon ..................... 74/84 S |
| 5,233,797 | A | | 8/1993 | Uno et al. |
| 5,347,884 | A | * | 9/1994 | Garnjost et al. ............. 74/570.2 |
| 5,903,077 | A | * | 5/1999 | Garnjost et al. ................. 310/81 |
| 7,132,817 | B2 | * | 11/2006 | Noe ................................. 322/29 |
| 2005/0075210 | A1 | | 4/2005 | Frederickson |
| 2005/0077845 | A1 | | 4/2005 | Olgac et al. |

FOREIGN PATENT DOCUMENTS

| | | |
|---|---|---|
| DE | 42 19 648 | 1/1993 |
| DE | 4219648 A1 * | 1/1993 |

(Continued)

*Primary Examiner* — Robert A Siconolfi
*Assistant Examiner* — Mahbubur Rashid
(74) *Attorney, Agent, or Firm* — Wood, Herron & Evans, LLP

(57) ABSTRACT

A system for damping oscillations in a structure provides two masses that can be controlled to rotate at the frequency of oscillation of the structure and in opposite directions about axes of rotation transverse to the direction of the oscillations. The masses have individually controllable moments of inertia, and when their moments of inertia are equal a harmonic linear force is generated. The phases of the rotating masses can be individually controlled whereby the direction of the resulting harmonic linear force can be controlled. The moments of inertia can be controlled by shifting their centers of gravity relative to the respective axes of rotation.

16 Claims, 2 Drawing Sheets

(56) References Cited

FOREIGN PATENT DOCUMENTS

| | | |
|---|---|---|
| EP | 0 409 462 | 1/1991 |
| EP | 0 853 197 | 7/1998 |
| FR | 2 858 034 | 1/2005 |
| JP | 60 237239 | 11/1985 |
| JP | 2001 020850 | 1/2001 |
| WO | 88 06687 | 9/1988 |
| WO | 95 02133 | 1/1995 |
| WO | 96 06290 | 2/1996 |

* cited by examiner

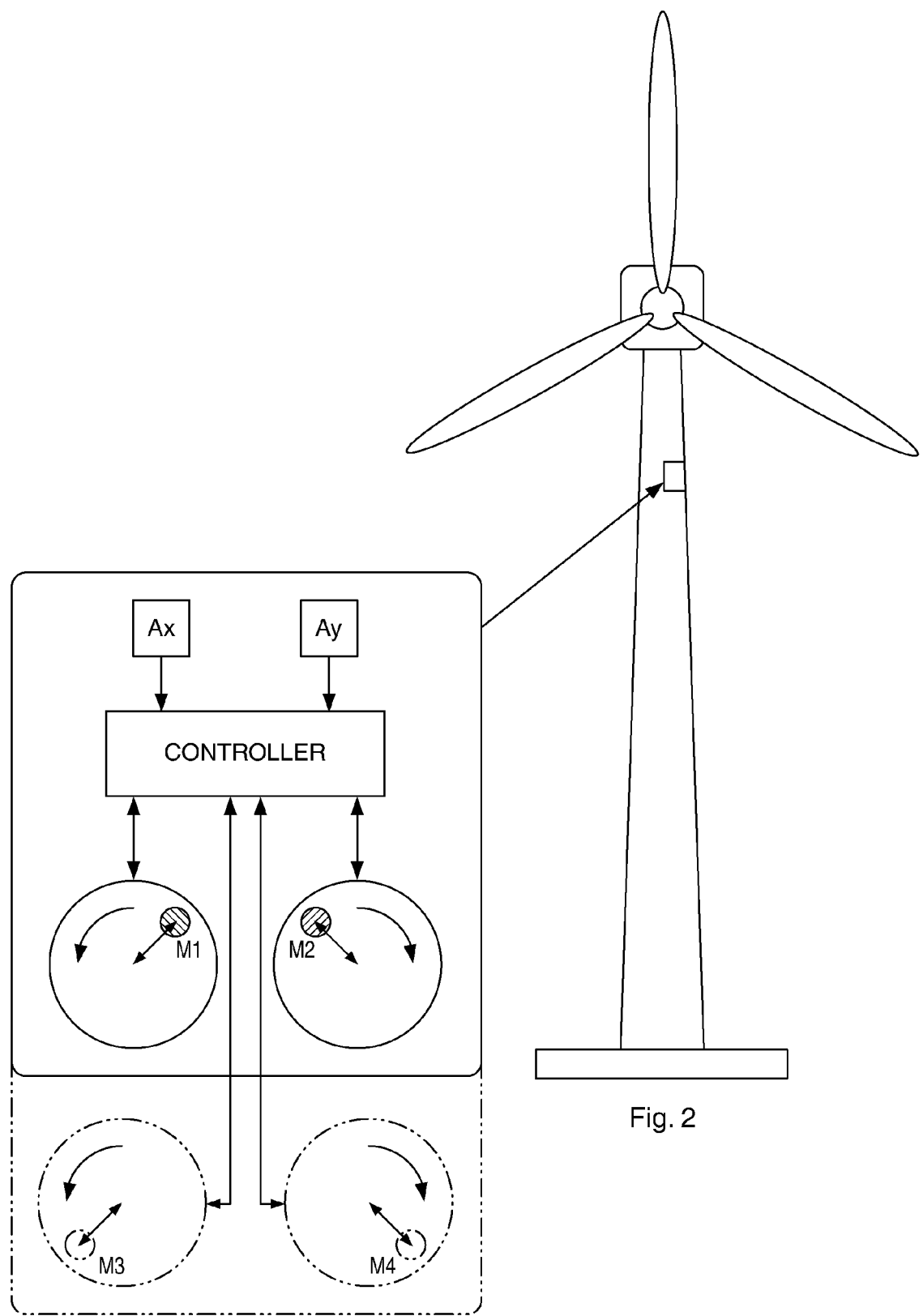

SYSTEM FOR DAMPING OSCILLATIONS IN A STRUCTURE

FIELD OF THE INVENTION

This invention relates to damping oscillations in stationary structures, for example, vertical tower-like structures such as wind turbine towers, chimneys, crane towers and building structures, but also horizontal structures such as bridges and crane arms, and also in moving structures such as wind turbine blades.

BACKGROUND OF THE INVENTION

For several reasons it may be desirable to dampen oscillations in such structures. Oscillations cause mechanical stress in the structures which may ultimately damage the structure itself. Human beings may experience discomfort when subjected to oscillations and equipment that is subject to oscillations may be caused to malfunction or even be damaged by oscillations.

JP 2001 020850 A and U.S. Pat. No. 5,233,797 both disclose a system for damping one-dimensional oscillations in wind turbine towers. A movable mass is set into simple linear oscillations.

SUMMARY OF THE INVENTION

The system for damping oscillations in a structure according to the invention provides two masses that can be controlled to rotate at the frequency of oscillation of the structure and in opposite directions about axes of rotation transverse to the direction of the oscillations. When two masses of equal moments of inertia are rotated at the same frequency in opposite directions, the resulting equivalent force will be a harmonic force. The phases of the rotating masses can be individually controlled whereby the direction of the resulting linear harmonic motion can be controlled. The masses have individually controllable moments of inertia, and the moments of inertia can be controlled, for example, by shifting their centres of gravity relative to the respective axes of rotation. Thus by properly controlling the frequency, the amplitude and the phases of the rotating masses the resulting oscillations of the structure can be damped.

When the oscillating structure is a wind turbine tower the direction of the oscillation will often be in the axial direction of the rotor or in a relatively narrow interval around the axial direction such as up to about.+-.30 degrees. Under that assumption detection of the direction of the oscillation may be dispensed with, and the system for damping the oscillations can be mounted, for example, in the nacelle or in a fixed angle relative to the nacelle to be rotated together with the nacelle so as to dampen the oscillations in the axial direction.

The system may have means for detecting the direction of the oscillation such as a pair of accelerometers or other oscillation sensors. The absolute and relative phases of the moments of inertia can then be controlled so that the resulting combined motion of the rotating masses is in the detected direction of the oscillation. When used in a wind turbine tower the system of the invention may then be mounted at a fixed position in or at the tower.

The direction of the resulting combined motion of the rotating masses can be controlled by adjusting the angular position of the entire system or at least of the rotating masses treated as a unit, or by adjusting the absolute and relative phases of the rotating masses.

BRIEF DESCRIPTION OF THE DRAWING

FIG. 1 shows schematically a system for damping oscillations in a structure according to the invention, FIG. 2 illustrates a wind turbine tower with the system in FIG. 1 fixed thereto.

DETAILED DESCRIPTION OF THE INVENTION

Figure 3:
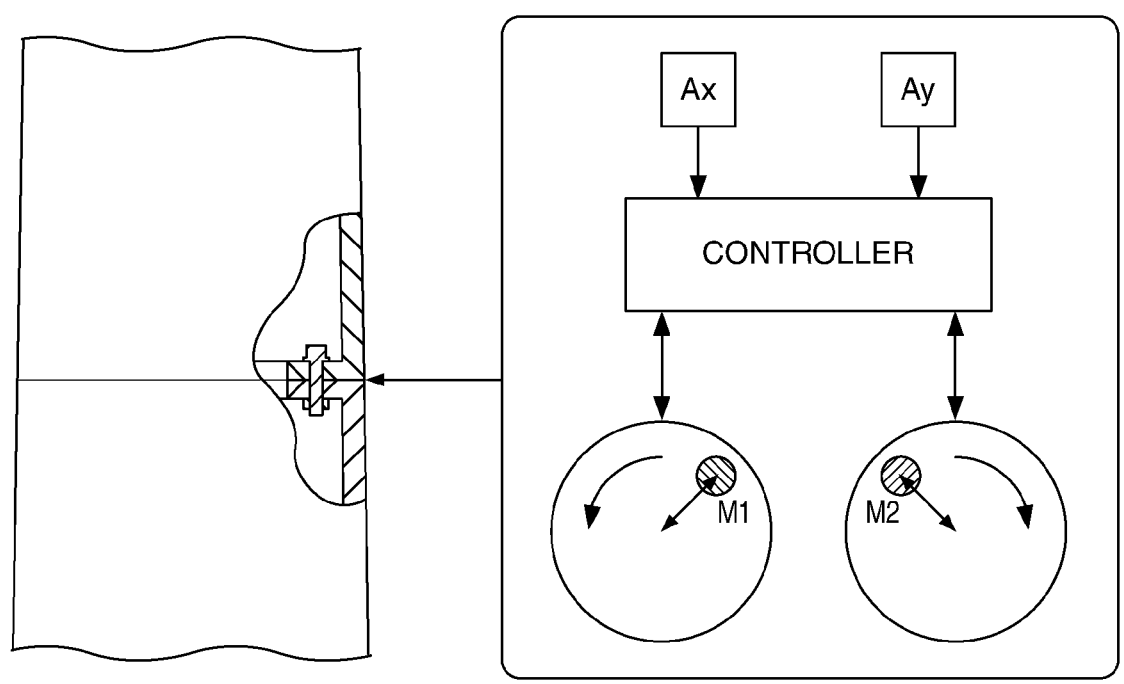
FIG. 3 illustrates the system being coupled to a flange joint of a wind turbine tower.

The system in FIG. 1 comprises two oscillation sensors such as accelerometers Ax and Ay for sensing oscillations in perpendicular horizontal directions, the X direction and the Y direction. The skilled person will know how to use other types of oscillation sensors such as velocity sensors and displacement sensors and make appropriate changes. Signals representing the sensed accelerations in the X and Y directions are input to a controller where the input signals are processed to determine relevant properties of the sensed oscillation. Such properties include, for example, one or more frequencies of oscillation and also the corresponding amplitudes and phases in order to determine the direction of the oscillation in the plane determined by the X and Y directions at the individual frequencies. Typical frequencies to be damped are the fundamental frequency of the structure and its harmonics.

For each particular frequency to be damped, its actual frequency, amplitude and direction are measured. Then the controller calculates moments of inertia of the two masses appropriate for counteracting the oscillation. The individual phases of the rotation of the masses at the measured frequency are calculated so that the direction of the resulting equivalent linear harmonic motion is the same as the direction of the oscillation to be damped.

The moments of inertia can be varied in several ways. For example the two masses M1 and M2 can be solid masses that can be moved to different distances from the respective axes of rotation, or the masses can be a substance such as a liquid or a granular solid substance that can be pumped and distributed in separate chambers or compartments. By moving the masses or changing their radial distributions their moments of inertia can be controlled to the desired calculated values.

The two masses are set into rotation at the measured frequency of oscillation to be damped. The motors used for rotating the masses can be controlled to rotate at a desired frequency and phase.

Stepper motors are particularly useful for individually controlling the phases of the rotating masses M1 and M2. When the two masses are of equal moments of inertia and are rotated at the same frequency in opposite directions, the resulting equivalent motion will be a linear harmonic motion. By changing the phase of one or both masses the direction of the resulting equivalent linear harmonic motion will change correspondingly. Hereby the direction of the resulting equivalent linear harmonic motion can be controlled. Alternatively the angle of the assembly including the two rotating masses relative to the structure can be adjusted to obtain the desired direction of the resulting equivalent linear harmonic motion.

Two masses of equal moments of inertia will result in an equivalent linear harmonic motion when rotated in opposite directions at the same frequency. This is useful for damping linear oscillations. Two masses of unequal moments of inertia will result in an equivalent elliptical harmonic motion when rotated in opposite directions at the same frequency. This is useful for damping elliptical oscillations.

The first calculation of adjusting the moments of inertia and the phases may not immediately give a perfect damping of the oscillations. Therefore, the oscillation damping process is a continuous and adaptive process where the effect of a correction can be observed immediately. The residual oscillation is constantly measured, and if the residual oscillation is within acceptable limits no change is made to the moments of inertia and their phases. If and when the residual oscillation exceeds acceptable limits the moments of inertia and the phases of the rotating masses are recalculated and changed accordingly. Further, the oscillations are likely to change with time, and therefore the oscillations are measured continuously.

In FIG. 2 is illustrated a wind turbine tower with a nacelle on top of the tower. The above-described system is shown mounted inside the tower. The system can be produced as a unit for retrofitting into existing wind turbine towers and other structures, or it can be installed in the tower from the beginning. The system can have its own controller as illustrated, or control can be performed by a controller in the wind turbine. The system can be mounted on a platform welded to a wall of the tower, preferably on the inside, or mounted to a flange joint joining two tower sections (FIG. 3). The system should preferably be mounted at a position where the oscillations are largest. Thus, for damping first order oscillations the system should be mounted near the top of the tower, and for damping second order oscillations the system should be mounted near the middle of the tower, i.e., at about half of the height of the tower.

In an alternative version, the system can have a first pair of counter-rotating masses for damping oscillations in a first horizontal direction and a second pair of counter-rotating masses for damping oscillations in a second horizontal direction. Preferably the first and second directions are perpendicular to each other. Together the two pairs of counter-rotating masses are suitable for damping vibrations in any horizontal direction. Similarly, the system can be expanded with a third pair of counter-rotating masses for damping oscillations in the vertical direction.

In FIG. 1 the two rotating masses M1 and M2 are shown side by side with their axes of rotation parallel to each other. Alternatively they may be arranged coaxially one above the other whereby they take up less space in the direction transversal to the axis of rotation.

The invention claimed is:

1. A system for damping oscillations in a structure, comprising:
    one or more sensors for receiving input usable for determining the frequency and the amplitude of the oscillations in the structure;
    a first mass rotatable in a first direction of rotation about a first axis of rotation transverse to the direction of the oscillations, the first mass having a first controllable moment of inertia about the first axis of rotation, wherein the first mass is configured such that the first moment of inertia may be held constant during rotation of the first mass about the first axis of rotation;
    a second mass rotatable in a second direction of rotation opposite the first direction of rotation about a second axis of rotation, the second mass having a second controllable moment of inertia about the second axis of rotation, wherein the second mass is configured such that the second moment of inertia may be held constant during rotation of the second mass about the second axis of rotation; and
    a controller that controls the first and second moments of inertia in response to the input received by the one or more sensors and controls the first and second masses to rotate at the detected frequency and at respective phases such as to dampen the oscillations when the system is secured to the structure;
    wherein when damping linear oscillations in the structure the controller provides the first and second masses with equal moments of inertia about the first and second axes of rotation, and when damping non-linear oscillations in the structure the controller provides the first and second masses with unequal moments of inertia about the first and second axes of rotation.

2. The system according to claim 1, further comprising a sensor for determining a direction of the oscillations in the structure.

3. The system according to claim 1, wherein the phase of each of the first and second masses is individually controllable.

4. The system according to claim 1, further comprising stepper motors for rotating the first and second masses.

5. The system according to claim 1, wherein an angle of an assembly of the first and second rotating masses relative to the structure is adjustable.

6. The system according to claim 1, wherein the second axis of rotation is parallel to the first axis of rotation.

7. The system according to claim 1, wherein the first and second masses form a first pair of masses for damping oscillations in a first direction of oscillation, the system further comprising:
    a third mass rotatable in a first direction of rotation about a third axis of rotation transverse to the direction of the oscillations, the third mass having a third controllable moment of inertia about the third axis of rotation; and
    a fourth mass rotatable in a second direction of rotation opposite the first direction of rotation about a fourth axis of rotation, the fourth mass having a fourth controllable moment of inertia about the fourth axis of rotation, wherein the third and fourth masses form a second pair of masses for damping oscillations in a second direction of oscillation.

8. A structure that can undergo oscillations and including a system according to claim 1 mounted at a position where the oscillations to be damped are largest.

9. A wind turbine, comprising:
    a tower;
    a nacelle located adjacent a top of the tower;
    a rotor having a hub and at least one blade extending therefrom; and
    a system coupled to the tower for damping oscillations in the tower, the system comprising:
        one or more sensors for determining the frequency and the amplitude of the oscillations in the tower;
        a first mass rotatable in a first direction of rotation about a first axis of rotation transverse to the direction of the oscillations, the first mass having a first controllable moment of inertia about the first axis of rotation, wherein the first mass is configured such that the first moment of inertia may be held constant during rotation of the first mass about the first axis of rotation;
        a second mass rotatable in a second direction of rotation opposite the first direction of rotation about a second axis of rotation, the second mass having a second controllable moment of inertia about the second axis of rotation, wherein the second mass is configured such that the second moment of inertia may be held constant during rotation of the second mass about the second axis of rotation; and
        a controller that controls the first and second moments of inertia in response to input received by the one or more sensors and controls the first and second masses to rotate at the detected frequency and at respective phases such as to dampen the oscillations in the tower;

wherein when damping linear oscillations in the structure the controller provides the first and second masses with equal moments of inertia about the first and second axes of rotation, and when damping non-linear oscillations in the structure the controller provides the first and second masses with unequal moments of inertia about the first and second axes of rotation.

10. The wind turbine according to claim 9, wherein the system is welded to a wall of the tower.

11. The wind turbine according to claim 9, wherein the system is mounted to a flange joint joining two tower sections.

12. A system for damping oscillations in a structure, comprising:

one or more sensors for receiving input usable for determining the frequency and the amplitude of the oscillations in the structure;

a first mass rotatable in a first direction of rotation about a first axis of rotation transverse to the direction of the oscillations;

a second mass rotatable in a second direction of rotation opposite the first direction of rotation about a second axis of rotation, wherein each of the first and second masses is selectively movable relative to their respective first and second axes of rotation from a first position at which the corresponding mass may be held constant to a second position at which the corresponding mass may be held constant so as to vary the first and second moments of inertia of the first and second masses relative to the first and second axes of rotation, respectively; and a controller that controls the movement of the first and second masses relative to the first and second axes in response to the input received by the one or more sensors and controls the first and second masses to rotate at the detected frequency and at respective phases such as to dampen the oscillations when the system is secured to the structure;

wherein when damping linear oscillations in the structure the controller provides the first and second masses with equal moments of inertia about the first and second axes of rotation, and when damping non-linear oscillations in the structure the controller provides the first and second masses with unequal moments of inertia about the first and second axes of rotation.

13. A method of damping oscillations in a wind turbine, comprising:

determining the frequency and amplitude of the oscillations in the wind turbine according to input received by one or more sensors associated with the wind turbine;

rotating a first mass in a first direction of rotation about a first axis of rotation transverse to a direction of the oscillations, the first mass having a first moment of inertia relative to the first axis of rotation;

rotating a second mass in a second direction of rotation opposite the first direction of rotation about a second axis of rotation, the second mass having a second moment of inertia relative to the second axis of rotation; and selectively varying with a controller at least one of the first and second moments of inertia, in response to the input received by the one or more sensors, from a first state to a second state at which the at least one of the first and second moments of inertia may be held constant so as to dampen the oscillations in the wind turbine;

wherein selectively varying with the controller at least one of the first and second moments of inertia includes providing the first and second masses with equal moments of inertia about the first and second axes of rotation when damping linear oscillations in the structure, and providing the first and second masses with unequal moments of inertia about the first and second axes of rotation when damping non-linear oscillations in the structure.

14. The method according to claim 13, wherein selectively varying at least one of the first and second moments of inertia further comprises increasing or decreasing a distance between at least one of the first and second masses relative to its respective axis of rotation.

15. The method according to claim 13, wherein selectively varying at least one of the first and second moments of inertia further comprises increasing or decreasing a mass of at least one of the first and second masses.

16. The method according to claim 13, wherein selectively varying at least one of the first and second moments of inertia further comprises shifting a center of gravity of at least one of the first and second masses relative to its respective axis of rotation.

* * * * *